(12) United States Patent
Djordjevic et al.

(10) Patent No.: US 8,977,121 B2
(45) Date of Patent: Mar. 10, 2015

(54) SPATIAL DOMAIN BASED MULTI DIMENSIONAL CODED MODULATION FOR MULTI TB PER SECOND SERIAL OPTICAL TRANSPORT NETWORKS

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 714 days.

(21) Appl. No.: 13/270,213

(22) Filed: Oct. 10, 2011

(65) Prior Publication Data

US 2012/0207470 A1    Aug. 16, 2012

Related U.S. Application Data

(60) Provisional application No. 61/442,854, filed on Feb. 15, 2011.

(51) Int. Cl.
| | | |
|---|---|---|
| H04J 14/04 | (2006.01) | |
| H04J 14/02 | (2006.01) | |
| H04B 10/25 | (2013.01) | |
| H04B 10/291 | (2013.01) | |
| H04J 14/06 | (2006.01) | |

(52) U.S. Cl.
CPC .......... *H04J 14/0278* (2013.01); *H04B 10/25* (2013.01); *H04B 10/291* (2013.01); *H04J 14/0201* (2013.01); *H04J 14/04* (2013.01); *H04J 14/06* (2013.01)
USPC ................... 398/44; 398/43; 398/50; 398/79; 398/83

(58) Field of Classification Search
CPC .. H04B 10/25; H04B 10/2504; H04B 10/291; H04B 10/2912; H04B 10/504; H04B 10/505; H04J 14/0201; H04J 14/0204; H04J 14/0205; H04J 14/0278; H04J 14/04; H04J 14/06
USPC ................. 398/79, 82, 83, 44, 45, 43, 50, 56
See application file for complete search history.

(56) References Cited

U.S. PATENT DOCUMENTS

| | | | | |
|---|---|---|---|---|
| 6,473,214 | B1* | 10/2002 | Roberts et al. | 398/183 |
| 6,607,311 | B1* | 8/2003 | Fishman et al. | 398/79 |
| 7,010,229 | B2* | 3/2006 | Copeland et al. | 398/92 |
| 7,992,070 | B2* | 8/2011 | Djordjevic et al. | 714/755 |
| 2002/0024693 | A1* | 2/2002 | Manor et al. | 359/124 |
| 2009/0092394 | A1* | 4/2009 | Wei et al. | 398/79 |

OTHER PUBLICATIONS

Yan Tang et al. ("Coherent Optical OFDM Transmission Up to 1 Tb/s per Channel", Journal of Lightwave Technology, vol. 27, No. 16, Aug. 15, 2009).*

(Continued)

*Primary Examiner* — M. R. Sedighian
(74) *Attorney, Agent, or Firm* — Joseph Kolodka (57) ABSTRACT

An optical transport network based on multimode/multicore fibers includes a mode-multiplexer to multiplex independent data streams from one or more transmitters; a multimode erbium-doped fiber amplifier (MM EDFA) to compensate for MMF loss; a multimode optical add-drop multiplexer (MM OADM) to add and/or drop multimode channels in multimode networks; a multimode optical cross-connect; and a mode-demultiplexer to separate various mode streams to one or more receivers.

19 Claims, 6 Drawing Sheets

(56) References Cited

OTHER PUBLICATIONS

Y. Ma, Q. Yang, Y. Tang, S. Chen and W. Shieh, "1-Tb/s single-channel coherent optical OFDM transmission over 600-km SSMF fiber with subwavelength bandwidth access," Opt. Express 17, 9421-9427 (2009).

Y. Tang and W. Shieh, "Coherent optical OFDM transmission up to 1 Tb/s per channel," J. Lightw. Technol. 27, 3511-3517 (2009).

J. McDonough, "Moving standards to 100 GbE and beyond," IEEE Appl. & Practice 45, 6-9 (2007).

I. B. Djordjevic, M. Arabaci, and L. Minicoy, "Next generation FEC for high-capacity communication in optical transport networks" J. Lightw. Technol. 27, 3518-3530 (2009).

H. G. Batshon, I. B. Djordjevic, L. Xu and T. Wang, "Modified hybrid subcarrier/amplitude/ phase/polarization LDPC-coded modulation for 400 Gb/s optical transmission and beyond," Opt. Express 18, 14108-14113 (2010).

H. G. Batshon, I. B. Djordjevic, T. Schmidt, "Ultra high speed optical transmission using subcarrier-multiplexed four-dimensional LDPC-coded modulation," Opt. Express 18, 20546-20551 (2010).

H. G. Batshon, I. B. Djordjevic, L. Xu and T. Wang, "Multidimensional LDPC-coded modulation for beyond 400 Gb/s per wavelength transmission," IEEE Photon. Technol. Lett. 21, 1139-1141 (2009).

\* cited by examiner

SPATIAL DOMAIN BASED MULTI DIMENSIONAL CODED MODULATION FOR MULTI TB PER SECOND SERIAL OPTICAL TRANSPORT NETWORKS

The present application claims priority to Provisional Application Ser. No. 61/442,854, filed Feb. 15, 2012, the content of which is incorporated by reference.

BACKGROUND

The present application relates to a serial optical transport networks based on multimode/multicore fibers.

The optical communication systems have been rapidly evolving recently in order to meet continuously increasing demands on transmission capacity, originating mostly from the Internet and multimedia applications. In order to satisfy high capacity demands, according to some industry experts, the 1 TbE standard should be completed in several years. Coherent optical OFDM is one possible pathway towards achieving multi-Tb/s optical transport. Another approach is based on multidimensional coded modulation. Namely, by increasing the number of dimensions (i.e., the number of orthonormal basis functions), a system can increase the aggregate data rate of the system without degrading the bit error rate (BER) performance as long as orthogonality among basis functions is preserved. Most of the papers on multidimensional signal constellations for optical communications so far have been related to single carrier and SMF-based systems.

The MMF is traditionally considered as the medium for short-reach applications. However, one recent experiment, in which 21.4 Gb/s polarization-multiplexed coherent OFDM transmission over 200 km of MMF has been demonstrated, indicates that MMFs can be used for metro and medium-haul applications, as well. Today's MMFs are however far away from being a medium suitable for long-haul transmission. The main issues are related to high loss and excessive number of modes that overwhelms the computational capabilities of currently existing silicon chips. Interestingly enough, the theory behind dual-mode optical fiber is well developed. For example, the group delay experiences a difference between $LP_{01}$ and $LP_{11}$ modes vanishes at the normalized frequency of $V_0=6.8$, which is just below the cutoff frequency of the third mode. The corresponding core diameter and the refractive index difference at $\lambda=1380$ nm are 24.8 μm and $\Delta=(n_1^2-n_2^2)/2n_1^2=0.3\%$ [where $n_1$ ($n_2$) is the refractive index of the core (cladding)], respectively. The similar approach is applicable to few-mode fibers.

SUMMARY

Systems and methods are disclosed for an optical transport network based on multimode/multicore fibers. The network includes a mode multiplexer to receive inputs from one or more transmitters; a multimode erbium-doped fiber amplifier (MMEDFA) coupled to the mode multiplexer; a multimode optical add-drop multiplexer (MMOADM) coupled to the MMEDFA; an optical cross-connect coupled to the MMOADM; and a mode demultiplexer coupled to the optical cross-connect to provide data to one or more receivers.

Implementations of the foregoing may include one or more of the following. The spatial-domain-based networking scenario is explored. Key components required for spatial-domain-based networking are identified and corresponding implementations are proposed as well. The key optical components for spatial-domain based networking are: MMF multiplexers/demultiplexers, MMF amplifiers, MMF optical add-drop multiplexers, and modes-detector. The operation principle of passive devices is described as follows: the spatial-mode signal is first split using a modes-demultiplexer, and then each mode is processed by the corresponding SMF component, and finally, the resulting SMF signals are combined using a mode-multiplexer. The operation principle of MMF amplifiers is described as follows: the weak spatial-mode signal and the corresponding pump signals are combined together by using a spatial-mode WDM combiner. To avoid the mode-dependent gain problem, the corresponding pumps are independently adjusted so that different spatial-modes have the same output power level. The integration principle can be described as follows: (i) integrate the power combiner, a series of electro-optical modulators (EO MODS) and mode-multiplexer, shown in FIG. 1(b), on a single chip; and (ii) to integrate modes-demultiplexer and series of photodetectors or alternatively donut-shape-based photodetector on a single chip.

Advantages of proposed spatial-domain-based multidimensional coded-modulation scheme may include one or more of the following. The system improves dramatically OSNR sensitivity by using N-dimensional (ND) signal constellations instead of conventional 2D constellations (QAM or PSK). The system uses N-dimensional constellations by employing orbital angular momentum (OAM) states as basis functions, therefore, for the same average symbol energy of 2D constellation, the Euclidean distance is much larger resulting in much better BER performance. In other words, for the same target BER, OSNR penalty improvement of conventional 2D coded-modulation is large (>8 dB for large constellations). In combination with quasi-cyclic binary/non-binary LDPC codes of large girth, the system can achieve multi-Tb/s serial optical transmission for long-haul applications. In combination with in-phase (I) and quadrature (Q) channels, the corresponding space is 2N-dimensional. If further polarization is used, the corresponding space will be 4N-dimensional. When compared to SMFs, MMFs offer (i) easier installation, maintenance and handling, which leads to lower-cost systems; (ii) larger effective cross-sectional area, which increases the immunity to fiber nonlinearities; and (iii) many modes for transmission, which improves the spectral efficiency when an MMF is treated as a multiple-input multiple-output (MIMO) channel in a similar methodology used in wireless communications. By employing OAM states in combination with spin angular momentum (SAM) the dimensionality of OAM-space can be doubled.

BRIEF DESCRIPTION OF THE DRAWINGS

FIG. 1A shows an exemplary MMF-supported network, while

FIG. 2A shows an exemplary block diagram of a passive multi-mode compatible optical device, while

FIG. 3A shows an exemplary frame organization for a mode multiplexing/demultiplexing for 10 Tb/s Ethernet, while

DESCRIPTION

Figure 1A:
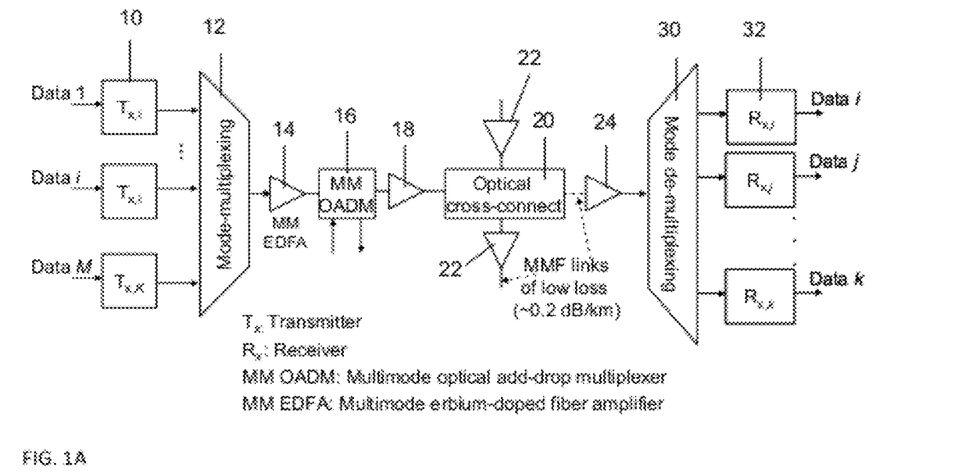
Figure 1B:
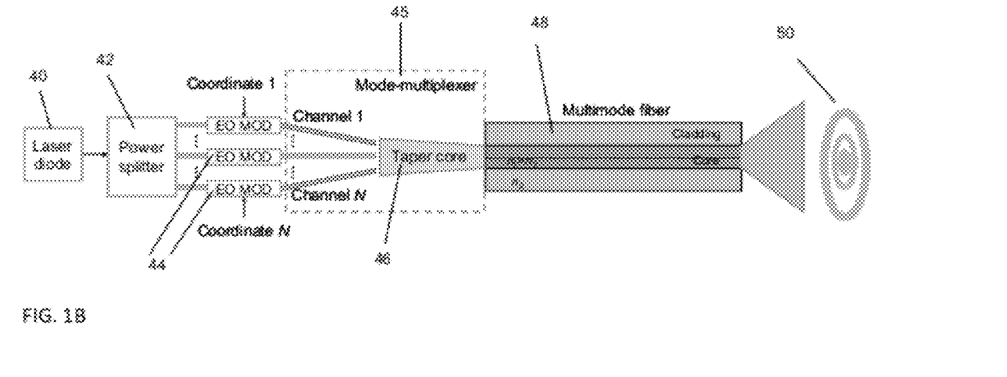
FIG. 1B illustrates a spatial-domain-based N-dimensional modulation.

One exemplary diagram of an MMF-based optical network is shown in FIGS. 1A-1B. The network contains at least the following MMF devices: MMF multiplexers/demultiplexers 12/30, MMF amplifiers 14, MMF optical add-drop multiplexers 16, and modes-detectors (portion of receivers). FIG. 1A shows an exemplary MMF supported network. In FIG. 1A, transceivers 10 forward data to mode-multiplexers 12, which in turn multiplexes independent data streams for transmission through a multimode fiber system of interest. To compensate for loss due to mode-multiplexing the boost multimode erbium-doped fiber amplifier (MM-EDFA) 14 is used. During propagation the multimode signal may enter the multimode optical add-drop multiplexer (MM OADM) 16. After various streams are dropped and/or added in MM OADM, the output of MM OADM 16 is boosted by amplifier 18. The MM signal can also enter the MM optical cross-connect (MM OXC) 20. Various MM input streams are pre-amplified by a plurality of amplifiers 22 that compensate for MMF propagation loss. The output of MM OXC is amplified by amplifier 22 to compensate for losses due to cross-connect operation. The signal is further periodically amplified, to compensate for propagation losses, until it reaches the desired destination. On destination side, the MM signal is first amplified by 22, and MM signal is further mode-demultiplexed 30. Various independent streams after OAM demultiplexing are converted into electrical domain by a plurality of receivers 32.

The proposed system/network increases the photon efficiency by increasing the number of degrees of freedom. Shannon's theory establishes that the information capacity is given by $C(X,Y)=(N/2)\log(1+\sigma^2_x/\sigma^2_z)$ [bits/channel use], where $\sigma^2_x$ is the variance of the source and $\sigma^2_z$ is the variance of the noise. Therefore, the information capacity is a logarithmic function of the signal-to-noise ratio (SNR) and a linear function of the number of dimensions N. The channel capacity formula indicates that the photon efficiency can be dramatically improved by increasing the number of dimensions. The total aggregate data rate can be significantly increased as long as the orthogonality among OAM basis functions is preserved. The system uses OAM modes in MMF as multidimensional basis functions.

The operation principle for spatial-domain-based modulation/multiplexing is illustrated in FIG. 1B. The spatial-domain-based modulator/multiplexer includes a laser diode 40 driving a power splitter 42. The power splitter in turn provides unmodulated signal to a plurality of electro-optic modulators (EO MODS) 44. During operation, the continuous wave laser diode 40 signal is split into N branches by using the power splitter (1:N star coupler) 42, the outputs are used as input of N electro-optic modulators (EO MODS) 44, such as Mach-Zehnder modulators. In mode-multiplexing, the N independent electrical data streams are modulated and used as input of mode-multiplexer 45, implemented by using N waveguides and taper-core fiber 46 within mode-multiplexer 45, as shown in FIG. 1B. In N-dimensional modulation instead, the input m bits are used as an address in look-up table (LUT) in which N-dimensional coordinates are stored, which are further used, after conversion into optical domain by EP MODS 44, as inputs to mode-multiplexer 45. The tapper-core fiber is properly designed so that orthogonal OAM modes are excited in MMF 48 and sent towards remote destination. At the end of MMF the corresponding MM signal 50 is modes-demultiplexed. The modes-demultiplexer can be implemented in similar fashion as mode multiplexer 44. Such a solution requires using the orthogonal demultiplexed modes as inputs of corresponding set of N photodetectors. Instead of using N different photodetectors for different modes, one embodiment uses one or more donut-shaped photodetectors which are able simultaneously to detect all separate OAM modes of interest.

Figure 2A:
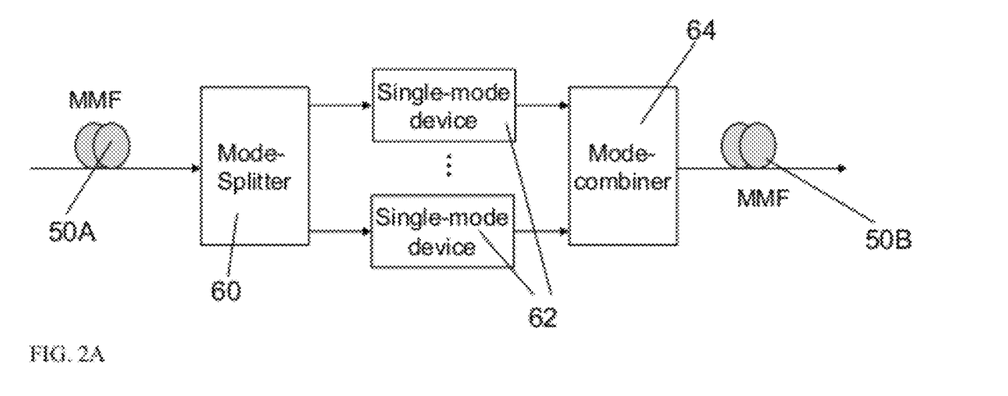
Figure 2B:
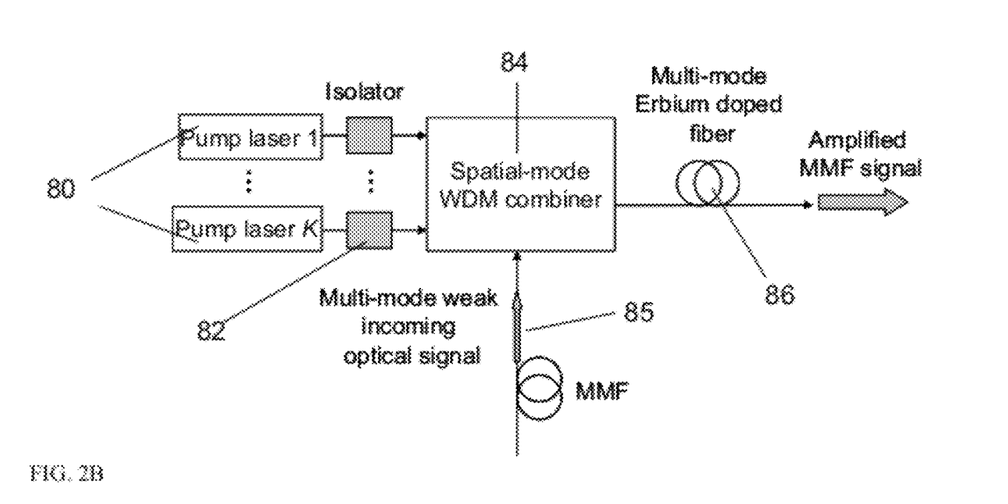
FIG. 2B shows an exemplary multi-mode EDFA.

The current passive devices are single-mode based and are highly wavelength dependent, and will not work as desired when a multimode signal is present. One embodiment for a spatial-mode scenario is illustrated in FIG. 2A. The spatial-mode signal from MMF 50A is first split using a splitter 60 or modes-demultiplexer, and then each mode is processed by the corresponding SMF component such as single-mode devices 62, and finally, the resulting SMF signals are combined using a mode-multiplexer 64 and sent over MMF 50B. The MM optical amplifier is a critical component, and can be implemented as illustrated in FIG. 2B where a plurality of pump lasers 80 signals, after isolators 82, are used as input to input of spatial-mode WDM combiner 84. The weak spatial-mode signal 85 and the corresponding pump signals are combined together by using a spatial-mode WDM combiner 84, and the amplified MMF signal is sent over a multimode Erbium doped fiber 86. To avoid the mode-dependent gain problem, the corresponding pumps are independently adjusted so that different spatial-modes have the same output power level.

Figure 3A:
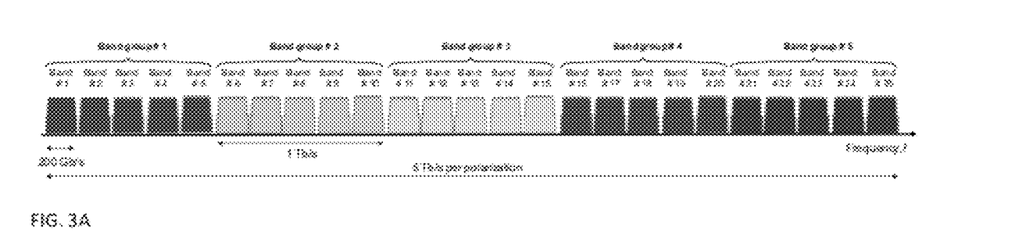
Figure 3B:
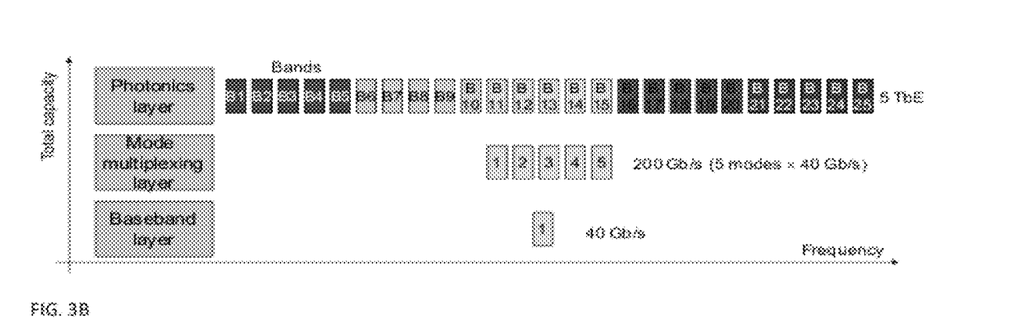
FIG. 3B shows an exemplary three-layer hierarchy.

FIGS. 3A-3B illustrate how the spatial-mode-multiplexing can be used to enable multi-Tb/s optical transport. The frame corresponding to 10 Tb/s is organized into five band-groups with center frequencies being orthogonal to each other, each carrying 1 Tb/s traffic. The center frequency of the bands within one band-group is also orthogonal to each other to simplify the band detection. One embodiment employs a three-layer architecture with the baseband being either a 40 Gb/s signal originating from 10 GbE or 40 GbE, respectively. If 10 Gb/s baseband is used, the system performs 4:1 RF multiplexing. This RF layer is optional and as such is not shown in FIG. 3A. The second layer is mode-multiplexing layer in which 5 orthogonal OAM modes are used to multiplex the corresponding 40 Gb/s streams resulting in 200 Gb/s aggregate data rate per band. The third layer, or the photonic layer, is implemented by combining the signals from five-frequency locked lasers into a 5 Tb/s serial optical transport signal. With polarization-multiplexing, the system can achieve 10 Tb/s serial optical transmissions. The RF layer, which is used to perform RF multiplexing, can quite readily be implemented in mixed-circuit CMOS ASICs. The photonics layer, on the other hand, can be implemented using photonic integrated circuit (PIC) technology.

Figure 4A:
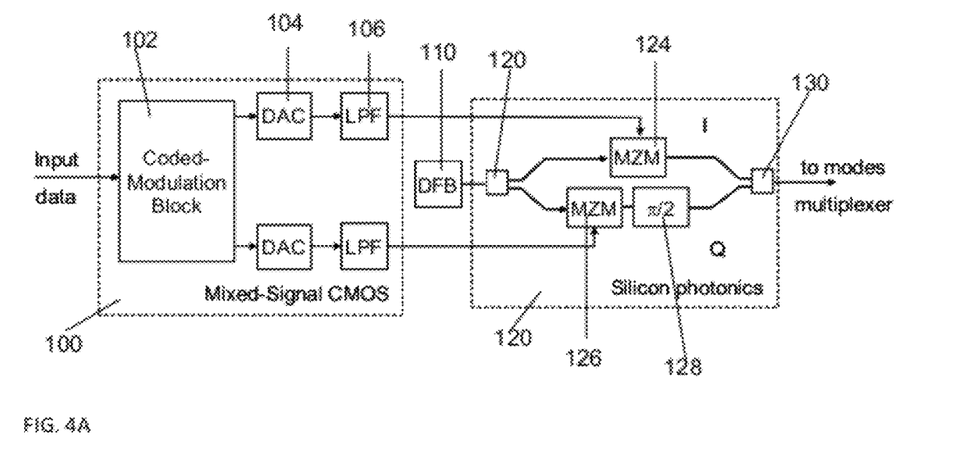
FIGS. 4A-4B show exemplary transmitter and receiver configurations for imposing I/Q coordinates of 4N-dimensional signal constellation for an optical transceiver for MMF-supported networks.
Figure 4B:
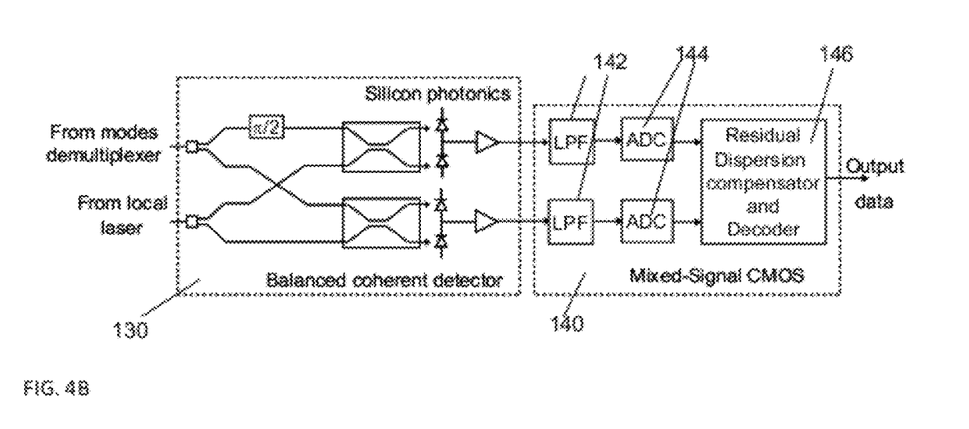

The corresponding transmitter (10) and receiver configurations (32), for the system shown in FIG. 1A, are given in FIGS. 4A and B, respectively. FIG. 4A shows a mixed signal CMOS device 100 and a silicon photonics device 120. The CMOS device 100 includes a coded modulation block 102, whose output is converted to analog domain by digital-to-analog converter (DAC) 104 and low-pass filter (LPF) 106. Two sets of DAC and LPF are need for in-phase and quadrature channels, respectively. The CMOS device 100 and a DFB 110 are connected to the silicon photonics device 120, composed of 3 dB-coupler 122 driving Mach-Zehnder modulators (MZMs) 124 and 126, and the π/2-phase shifter 128. The phase shifter 128 is employed to ensure the orthogonality of quadrature channel with respect to in-phase channel. The I/Q components are combined by 3 dB-coupler 130 and used as input to mode-multiplexer block 12.

FIG. 4B shows an exemplary optical receiver (32), which receives signals from modes demultiplexer. The mode-demultiplexer signal local laser signal is used as input to a balanced coherent detector 130. The output of the balanced detector 130 is supplied to a mixed signal CMOS detector and decoder 140 that includes LPF circuits 142 connected to digital-to-analog converters (DACs) 144. The outputs of the DACs are processes by a residual dispersion compensator and decoder 146. The RF building blocks can be implemented using the mixed-signal CMOS technology. The photonic building blocks can be implemented using CMOS photonics (or silicon photonics), except for lasers that must be flip-chip bonded on top of the silicon die, and germanium photodetectors that should be placed on top of the silicon waveguides. One embodiment integrates the power combiner, a series of EP MODS and mode-multiplexer, shown in FIG. 4B, on a single chip; and integrates modes-demultiplexer and series of photodetectors or alternatively donut-based photodetector on a single chip.

Implementations of mode-multiplexed and polarization-multiplexed, coded, multiband optical system enabling 10 Tb/s optical transport can include one or more of the following: (i) fabrication of MMFs with low attenuation and optimum profile index enabling zero multimode dispersion, (ii) development of both passive and active MMF devices discussed above, (iii) analysis of the nonlinear interaction among different modes from both polarizations, and (iv) development of efficient modulation and coding systems enabling multi-Tb/s optical transport over MMFs.

Among various optical beams that can carry OAM, the Laguerre-Gauss (LG) vortex beams can be easily be implemented. For example, the field distribution of an LG beam traveling along the z-axis can be expressed in cylindrical coordinates (r,φ,z) (r denotes the radial distance from propagation axis, φ denotes the azimuthal angle and z denotes the propagation distance) as follows:

$$u_{m,p}(r, \phi, z) = \sqrt{\frac{2p!}{\pi(p|m|)!}} \frac{1}{w(z)} \left[\frac{r\sqrt{2}}{w(z)}\right]^{|m|} \quad (1)$$

$$L_p^m\left(\frac{2r^2}{w^2(z)}\right) e^{-\frac{r^2}{w^2(z)}} e^{\frac{jkr^2 z}{2(z^2+z_R^2)}} e^{j(2p+|m|+1)\tan^{-1}\frac{z}{z_R}} e^{-jm\phi},$$

where $w(z) = w_0\sqrt{1+(z+z_R)^2}$ ($w_0$ is the zero-order Gaussian radius at the waist), $z_R = \pi w_0^2/\lambda$ is the Rayleigh range (with $\lambda$ being the wavelength), $k=2\pi/\lambda$ is the propagation constant, and $L_p^m(\cdot)$ is the associated Laguerre polynomial, with p and m representing the radial and angular mode numbers, respectively. It can be seen from (1) that the mth mode of the LG beam has the azimuthal angular dependence of the form exp$(-jm\phi)$, and consequently, m is also called the azimuthal mode number (index). For m=0, u(r,φ,z) becomes a zero-order Gaussian beam, that is the $TEM_{00}$ mode. For p=0, $L_p^m(\cdot)=1$ for all ms, so that the intensity of an LG mode is a ring of radius proportional to |m|.

For a fixed p, the following principle of orthogonality is satisfied:

$$\langle u_{m,p}, u_{n,p}\rangle = \int u_{m,p}^*(r, \phi, z) u_{n,p}(r, \phi, z) r \, dr \, d\phi \quad (2)$$

$$= \begin{cases} \int |u_{m,p}|^2 r \, dr \, d\phi, & n=m \\ 0, & n \neq m \end{cases}$$

because $$\int_{-1}^{1} \frac{L_p^m(x)L_p^n(x)}{1-x^2} dx = \begin{cases} 0, & m \neq n \\ \frac{(p+m)!}{m(p-m)!}, & m=n \neq 0 \\ \infty, & m=n=0 \end{cases}$$

Therefore, different OAM "states" corresponding to a fixed p are all orthogonal with one another, and hence, they can be used as basis functions for an OAM modulation. Spatial Division Multiplexing (SDM) in MMFs relies on skew rays or helical rays that spiral around the fiber's axis as they propagate along the fiber. Light following a helical path forms an optical vortex. The topological charge of the vortex depends on the number of complete turns around the axis in one wavelength. In other words, the integration of the phase around a closed path yields an integer multiple of $2\pi$. Thus we can deduce that skew rays indeed possess an orbital angular momentum (OAM). For an axially symmetric multimode fiber with a refractive index of $n^2(R)=n_1^2[1-2\Delta f(R)]$ [f(R) is the refractive index profile as a function of radial distance R], the solution for the electric filed distribution takes the form:

$$e = \hat{e}^{\pm}\exp(\pm jm\phi)F_m(R)\exp(j\beta z), \quad (3)$$

where $\hat{e}^{\pm}$ is the unit vector of the right (+)/left (−) circular polarization, φ is the azimuthal angle, m is the azimuthal index (m=0, 1, 2, . . . ), and β is the propagation constant. The exp(±jmφ) component denotes the azimuthal phase dependence. The radial function $F_m(R)$ can be found from the eigenvalue equation. The azimuthal dependence of (3) is the same as that of the LG modes, indicating that skew rays indeed possess the OAM.

Next, one embodiment supporting multi-Tb/s optical transport that is based on multidimensional (N-dimensional) coded modulation is detailed. By increasing the number of dimensions (i.e., the number of orthonormal OAM basis functions), the system can increase the aggregate rate of the system while enabling reliable transmission at these ultra-high speeds using low-density parity-check (LDPC) codes at each level. At the same time, for the same symbol energy, with multidimensional signal constellation we can increase the Euclidean distance between signal constellation points resulting in better BER performance.

Figure 5A:
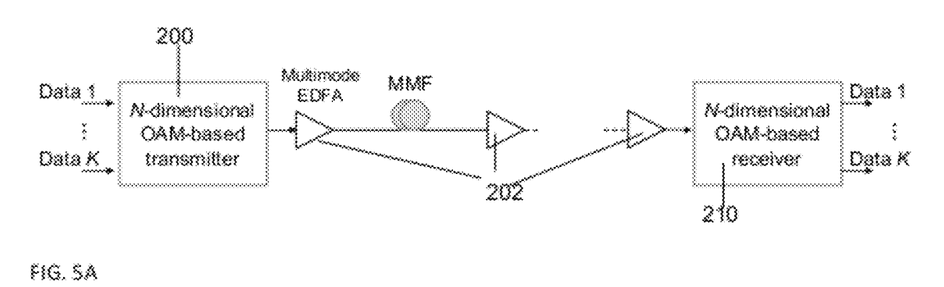
FIG. 5A-5D show an exemplary multidimensional LDPC-coded OAM-based modulation system for transmission over MMFs. Only N-dimensions (OAM-dimensions) are shown.

The overall system configuration is shown in FIG. 5A where an N-dimensional OAM based transmitter 200 receives data streams 1 to k, modulates them using N-dimensional OAM modulator, and transport to remote destination. During propagation periodically multimode EDFAs 202 are deployed to compensate for MMF fiber 204 loss. The first MM EDFA is used as boost amplifier, the last as pre-amplifier and the medium ones as inline MM amplifiers. On receiver side, the signal transported over MMF demodulated, detected and decoded in N-dimensional OAM Rx 210.

Figure 5B:
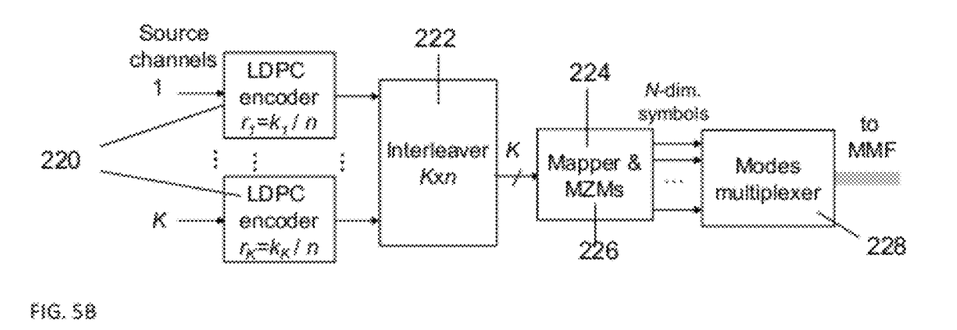
Figure 5C:
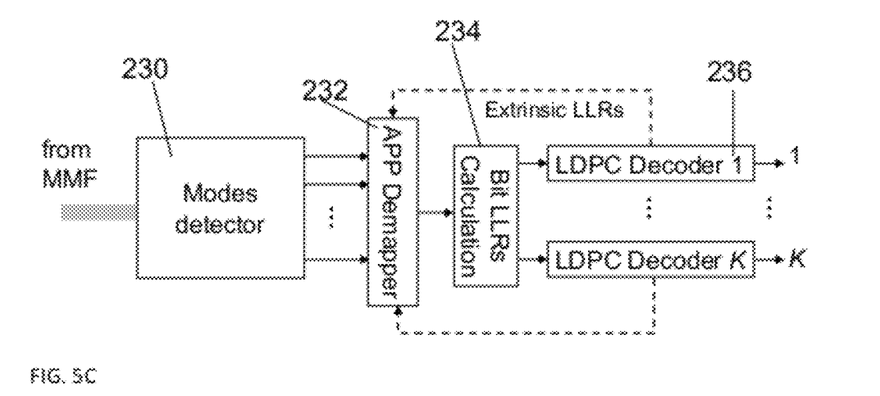

FIG. 5B shows an exemplary LDPC-coding based transmitter configuration, while FIG. 5C shows an exemplary LDPC coding based receiver configuration with direct detection. Turning now to FIG. 5B, a plurality of source channels 1 to K are provided to LDPC encoders 220, whose outputs written to block-interleaver 222 row-wise. K bits are taken from block-interleaver column-wise an used to select an ND-signal constellation point in mapper 224, implemented as an LUT. The coordinates from LUT are used as input to N MZMs 226. The MZM outputs are combined together in mode-multiplexer 228 and transmitted to remote destination by MMF.

FIG. 5C shows the receiver configuration with direct detection. The signal transported over MMF is used as input to a modes detector 230. The modes detector 230 provides the projection alon OAM modes, this projections are after ADCs used as input of an N-dimensional a posteriori probability (APP) demapper 232, whose output (symbol LLR) is used for bit LLR calculator 234. The bit LLRs are provided to a plurality of LDPC decoders 236.

As shown in FIG. 5B, K different bit streams coming from different information sources are encoded using different binary LDPC codes. The outputs of the encoders are then interleaved by a (K×n) block interleaver. The block interleaver accepts data from the encoders row-wise, and outputs the data column-wise to the mapper that accepts K bits at the time instance i. The mapper 224 determines the corresponding Q-ary ($Q=M^N$, M is the number of amplitude levels per dimension) signal constellation point $$s_i = C_N \sum_{j=1}^{N} \varphi_{i,j} \Phi_j, \tag{5}$$

The N-dimensional mapper outputs are used as the RF inputs into N Mach-Zehnder modulators (MZMs) integrated on the same chip. Finally, the modulated signals are sent over the MMF system of interest after being combined into an optical wave via a modes-multiplexer. In (5), which represents the general formula applicable to any N-dimensional constellation, the set $\{\Phi_1, \Phi_2, \ldots, \Phi_N\}$ represents a set of N orthonormal OAM basis functions. The number of bits per signal constellation point is determined by $\log_2(M^N)(=K)$. The dimensionality, N, and number of amplitude levels per dimension, M, is determined by the desired final rate. The band-group data rate of 1 Tb/s can be achieved in many different ways. For example, if the traffic originates from 40 GbE, selecting M=2 and N=5 results in an aggregate data rate of 200 Gb/s per subcarrier. When binary LDPC codes are used, the receiver side with direct detection can be depicted as in FIG. 5C. The outputs of the N branches of the modes-detector 230, are sampled at the symbol rate and the corresponding samples are forwarded to a posteriori probability (APP) demapper 232. The demapper 232 provides the symbol log-likelihood ratios (LLRs), which are used by the bit LLR calculator 234 to compute bit LLRs required for iterative LDPC decoding. To improve the overall system performance, the system iterates extrinsic information between LDPC decoders 236 and APP demapper 234 until convergence or until a predetermined number of iterations has been reached. From the description of the transmitter and the receiver set-ups, the system is scalable to any number of dimensions with small penalty in terms of BER performance, as long as the orthonormality between OAM states is preserved. Increasing the number of dimensions leads to an increased complexity, and hence, a compromise between the desired aggregate rate and the complexity of the system should be made in practice.

Figure 5D:
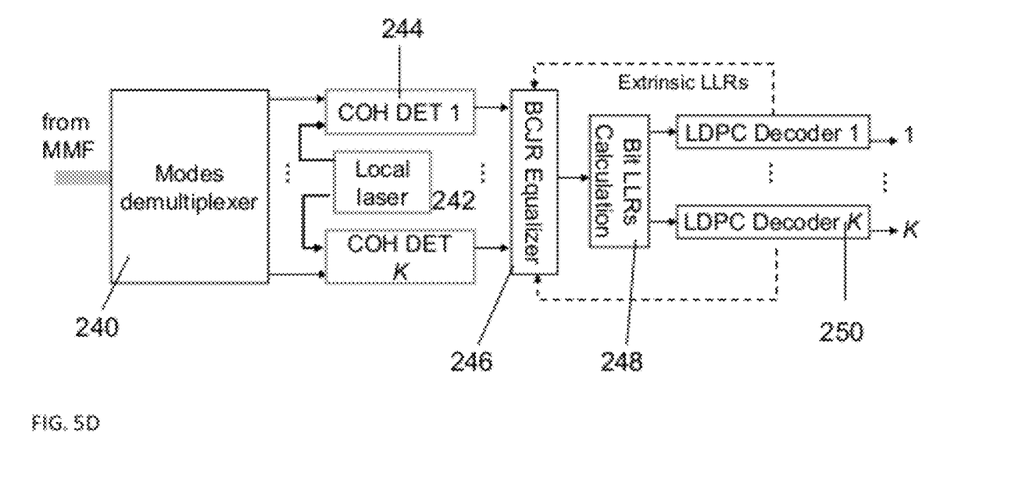

The receiver configuration with coherent detection is shown in FIG. 5D. A modes demultiplexer 240 provides signals to a plurality of coherent detectors 244 that are driven by a local laser 242. The coherent detectors 244 are connected to an N-dimensional BCJR equalizer 246, whose output drives a bit LLR calculator 248. The results are provided to LDPC decoders 250. The balanced coherent detector 244 configuration is already provided in FIG. 4B. The simplest spatial-domain based coded modulation system with direct detection can be described by the following set of constellation points for N=3 and M=2: {(0,0,0), (0,0,1), (0,1,0), (0,1,1), (1,0,0), (1,0,1), (1,1,0), (1,1,1)}, while the corresponding coherent detection counterpart is obtained substituting zeros with −1s. (The normalization factor $C_3$ in (5) is omitted to simplify presentation.) The signal constellation for coherent detection with N=3 and M=4 is given by: {(−3,−3,−3), (−3,−3,−1), (−3,−3,1), (−3,−3,3), . . . , (3,3,−3), (3,3,−1), (3,3,1), (3,3,3)}. These modulation formats can be straightforwardly extended to higher dimensions. For example, N-dimensional Cartesian product of one-dimensional pulse-amplitude modulation (PAM) can be employed.

Because OAM eigenstates are orthogonal, in principle, an arbitrary number of bits per photon can be transmitted. The ability to generate the OAM modes in multimode fibers (MMFs) will allow realization of fiber-optic communication networks with ultra-high bits-per-photon efficiencies. A spatial-domain-based multidimensional coded-modulation system can serve as an enabling technology for multi-Tb/s serial optical transport. Simulations indicate that an eight-dimensional (8D) spatial-domain-based coded modulation system outperforms its corresponding prior-art 4D counterpart by 3.88 dB at BER of 10-8, while outperforming its conventional polarization multiplexed QAM counterpart by even a larger margin of 8.39 dB (also at the BER of $10^{-8}$).

In addition to proposed spatial-domain-based multidimensional code-modulation system, spatial-domain-based networking scenario can be done. The major optical components for spatial-domain based networking include MMF multiplexers/demultiplexers, MMF amplifiers, MMF optical add-drop multiplexers, and modes-detector. The spatial-mode signal is first split using a modes-demultiplexer, and then each mode is processed by the corresponding SMF component, and finally, the resulting SMF signals are combined using a mode-multiplexer. In the MMF amplifiers, the weak spatial-mode signal and the corresponding pump signals are combined together by using a spatial-mode WDM combiner. To avoid the mode-dependent gain problem, the corresponding pumps are independently adjusted so that different spatial-modes have the same output power level. One embodiment integrates various devices as follows: (i) integrate the power combiner, a series of EO MODS and mode-multiplexer, shown in FIG. 1B, on a single chip; and (ii) integrate modes-demultiplexer and series of photodetectors or alternatively donut-shaped-based photodetector on a single chip. The operation of the mode multiplexing/demultiplexing can be done for 10 Tb/s Ethernet. A three-layer hierarchy for 10 Tb/s Ethernet is also disclosed.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:
1. An optical transport network, comprising:
 a. a mode multiplexer to combine inputs from one or more transmitters;
 b. a multimode erbium-doped fiber amplifier (MMEDFA) to compensate for multimode fiber loss;
 c. a multimode optical add-drop multiplexer (MMOADM) to add and/or drop multimode signals;
 d. a multimode optical cross-connect; and
 e. a mode demultiplexer to separate the mode-multiplexed streams and provide data to one or more receivers f. code to determine Laguerre-Gauss (LG) and vortex beams with a field distribution of an LG beam traveling along the z-axis in cylindrical coordinates (r,φ,z) (where r denotes radial distance from propagation axis, φ denotes azimuthal angle and z denotes propagation distance).

2. The network of claim 1, comprising a spatial-domain-based N-dimensional modulator.

3. The network of claim 2, comprising one electro-optical modulator (EO MOD) per coordinate coupled to a mode-multiplexer.

4. The network of claim 3, wherein the mode-multiplexer comprises a taper core receiving a plurality of channels.

5. The network of claim 4, wherein the taper core is coupled to a multimode fiber (MMF).

6. The network of claim 2, comprising a power splitter coupled to the EO MOD.

7. The network of claim 1, comprising a passive MM device coupled to an MMF.

8. The network of claim 7, wherein the passive MM device comprises a mode splitter coupled to a plurality of single mode devices, each of the single mode devices coupled to a mode combiner.

9. The network of claim 1, wherein the MM EDFA comprises a spatial mode WDM combiner receiving a multimode weak incoming signal and driving a multimode erbium doped fiber.

10. The network of claim 9, wherein corresponding laser pumps are independently adjusted so that different spatial-modes have the same output power level.

11. The network of claim 1, wherein K input bits are used as an address in a look-up table in which N-dimensional coordinates are stored and, after selection, used as inputs to the mode-multiplexer by EO MODs.

12. The network of claim 1, wherein orthogonal demultiplexed modes are used as inputs to a corresponding set of N photodetectors/receivers.

13. The network of claim 1, comprising a donut-shaped photodetector to simultaneously detect all separate OAM modes of interest.

14. The network of claim 1, wherein a center frequency of the bands within one band-group are orthogonal to each other to simplify the band detection.

15. The network of claim 1, comprising a three-layer architecture with a baseband layer, a mode multiplexing layer where several orthogonal OAM modes are used to multiplex corresponding data streams, and a photonic layer.

16. The network of claim 15, wherein the baseband layer comprises a coded modulation block coupled to DACs and low-pass filters.

17. The network of claim 15, wherein the photonic layer combines signals from several-frequency locked lasers into a serial optical transport signal.

18. The network of claim 1, comprising multimode fiber (MMF), multiplexers/demultiplexers, MMF amplifiers, MM optical add-drop multiplexers, MM cross-connects and modes-detector.

19. The network of claim 1, comprising code to determine.

$$u_{m,p}(r, \phi, z) = \sqrt{\frac{2p!}{\pi(p+|m|)!}} \frac{1}{w(z)} \left[\frac{r\sqrt{2}}{w(z)}\right]^{|m|}$$

$$L_p^m\left(\frac{2r^2}{w^2(z)}\right) e^{-\frac{r^2}{w^2(z)}} e^{-\frac{jkr^2z}{2(z^2+z_R^2)}} e^{j(2p+|m|+1)\tan^{-1}\frac{z}{z_R}} e^{-jm\phi},$$

where $w(z)=w_0\sqrt{1+(z/z_R)^2}$ ($w_0$ is the zero-order Gaussian radius at a waist), $z_R=\pi w_0^2/\lambda$ is the Rayleigh range (with $\lambda$ being the wavelength), $k=2\pi/\lambda$ is a propagation constant, and $L^m_p(\cdot)$ is Laguerre polynomial, with p and m representing radial and angular mode numbers.

* * * * *